3,402,160
STYRENE RESINS
Robert A. Hayes, Cuyahoga Falls, Ohio, assignor to The Firestone Tire & Rubber Company, Akron, Ohio, a corporation of Ohio
No Drawing. Continuation of application Ser. No. 475,585, July 28, 1965, which is a continuation-in-part of application Ser. No. 120,936, June 30, 1961. This application Feb. 16, 1967, Ser. No. 616,736
2 Claims. (Cl. 260—93.5)

ABSTRACT OF THE DISCLOSURE

Polystyrene, etc. is produced in filterable form by polymerizing styrene or methylstyrene in a solvent in which the polymer is insoluble, in the presence of a lithium catalyst and a polymeric suspending agent which is soluble in the solvent at the polymerization temperature.

---

This is a continuation of my application Ser. No. 475,585 filed July 28, 1965 and now abandoned, which is in turn a continuation-in-part of my application Ser. No. 120,936 filed June 30, 1961 and now abandoned.

This invention relates to the production of polystyrene.

Polystyrene has found various uses in industry. One of the important uses is an an industrial molding resin. Normally, styrene resins which produce clear molding compounds are relatively low in impact strength. High impact polystyrene has been prepared in various forms, including graft polymers and blends which require the use of relatively large quantities of rubber, all of which, when molded, give opaque or opalescent compositions.

Styrene is soluble in aliphatic saturated hydrocarbon solvents such as hexane, pentane, petroleum ether and the like. Polystyrene is not soluble in these solvents. Attempts to polymerize styrene in such solvents result in a polymer which sticks to the equipment and comes out as large balls, making such polymerizations impractical commerically.

The polymerization of this invention is carried out in such aliphatic solvents with an alkyl- or aryl-lithium catalyst. There is added as a suspending agent a small amount of polymer which is soluble in the solvent employed. A second requirement of the suspending agent is that it must be unreactive to the alkyl- or aryl-lithium compounds, including not only the lithium compound which is used as catalyst but also the active lithium compounds which result by polymerization of styrene with such catalysts. Such suspending agents include, for example, a polymer or copolymer of a diene containing 4 to 6 carbon atoms such as polybutadiene-1,3, polypiperylene, polyisoprene, poly(2,3-dimethylbutadiene-1,3) and poly(2-methylpentadiene-1,3) or a copolymer of at least 50 percent of such diene with styrene, alpha-methylstyrene, para-methylstyrene, or other hydrocarbon monomer which will give a polymer that is soluble in the hydrocarbon solvent at the temperatures employed. Although the preferred suspending agents are listed above, it is possible to use polymers or copolymers of olefinic hydrocarbons containing from 2 to 10 carbon atoms and which are soluble in the aliphatic hydrocarbon solvent at the temperature employed. Such polymers include polyisobutylene, polypropylene, polybutene, ethylene-propylene copolymers, isobutylene-isoprene copolymers, isobutylene-styrene copolymers and the like. The use of small amounts of such polymeric suspending agents makes it possible to produce polystyrene in the form of particles of a size to be readily filtered. By varying the quantity and molecular weight of the suspending agent, non-aqueous suspensions are obtained of particles which settle quickly and can be easily centrifuged or filtered.

Ordinarily the particle size of the suspension increases as the molecular weight of the suspending agent decreases, and ordinarily the molecular weight of the polymeric suspending agent will be above 1500 as materials of lower molecular weights generally fail to give the desired suspension. Particle size will decrease with increasing amounts of the particular suspending agent employed, i.e., either increasing the concentration of suspending agent in the solvent, or increasing the amount per 100 parts of styrene. Generally, from 0.05 to 3 parts by weight of suspending agent per 100 parts of monomer will be employed. The amount of suspending agent employed will determine the size of the particles formed. The more efficient the suspending agent, the smaller will be the amount required to produce the desired suspension.

The preferred solvents for the process are the saturated aliphatic hydrocarbons containing from 3 to 15 carbon atoms, including without limitation, propane, butane, isobutane, pentane, isopentane, neopentane, hexane, isohexane, neohexane, 2,3-dimethylbutane, heptane, isoheptane, octane, isooctane, nonane, isononane, decane, undecane, dodecane, trimethyldodecane and mixtures of any of the foregoing. In those cases where the polystyrene is to be isolated from the suspension the lower boiling solvents are desirable.

Alkyl- or aryl-lithium catalysts will be used. These include ethyllithium, butyllithium, amyllithium, hexyllithium, 2-ethylhexyllithium, n-decahexyllithium, trimethylenedilithium, tetramethylenedilithium, pentamethylenedilithium, phenyllithium, tolyllithiums, xylyllithiums, naphthyllithiums, etc. These alkyl- or aryl-lithium catalysts must be soluble in the monomer-solvent mixture employed.

The monomer-solvent, suspending-agent mixture must be substantially free of impurities which can react with the catalyst and destroy its activity. The harmful impurities generally consist of water, air, or compounds containing active hydrogen atoms such as phenyl or alkyl acetylenes, alcohols, phenols, some carbonyl compounds and the like. Whenever these materials are present some catalyst will react with them and be destroyed. Thus an excess of catalyst must be used when such impurities are present.

One of the methods of obtaining the desired purity of the styrene monomer and the solvent required for alkyl- or aryl-lithium catalysts is to pass a solution of these two through a column containing activated alumina. The resulting solution has a sufficiently low level of impurities to operate satisfactorily in the process. The small amounts of impurities such as water, air, or various carbonyl compounds which remain after this treatment can be removed by a small amount of the anionic catalyst employed.

The molecular weight of the suspending agent may be as low as about 1500, but may higher, such as 15,000 or much higher. There is no critical upper limit to the molecular weight. Larger amounts of higher molecular weight rubbers may produce opalescence in the product.

Although the following examples refer more particularly to the polymerization of styrene, the process is equally applicable to styrene derivatives including alpha-methylstyrene, o-, p- and m-methylstyrenes, the various vinylxylenes and homologs, when substituted for the styrene of the examples.

The temperatures of the examples are illustrative and the temperatures known to be employed for polymerization with the respective classes of catalysts can be used. A polymerization temperature in the range of −100° C. to +250° C. is satisfactory, depending upon specific conditions, as will be readily understood by one skilled in the art.

The properties of the polystyrene resin obtained by this process and then injection molded are dependent upon the molecular weight of the polystyrene. This is conveniently measured by measuring the viscosity of a 1 percent solution of the polymer in toluene. Relative viscosities of between 1.5 and 3.0 give the most satisfactory results. If the viscosity is below 1.5 the product has reduced impact strength. If it is above 3.0 it is extremely difficult to injection mold it satisfactorily. The polystyrenes of such molecular weight when prepared with an alkyl- or aryl-lithium, as catalyst, have high impact strength. They are claimed in my application Ser. No. 129,974 filed Aug. 8, 1961, now abandoned.

Methods of controlling the molecular weight of the styrene resin product depend upon the particular catalyst used. In general, increasing the catalyst concentration reduces the molecular weight. In polymerizations in which an alkyl or aryl lithium catalyst is used molecular weight is quite sensitive to the amount of catalyst used and to the impurities present in the solution to be polymerized. The invention contemplates the use of sufficient organo lithium compound to provide between about 0.10 and about 1.0 milliatom of active lithium per 100 grams of monomer, in addition to that amount of catalyst required to remove the last traces of harmful impurities. It is usually desirable to use sufficient such catalyst to provide such excess of between 0.2 and 0.6 milliatom of active lithium per 100 grams of monomer in order to produce styrene resins in the viscosity range desired for injection molding.

The preparation of high-impact-strength resins which are essentially polystyrene and which do not require the relatively large amounts of high molecular weight rubbers is new to the art. The presence of the relatively large amounts of high molecular weight rubber in the high impact strength resins which are known in the art results in a substantial lowering of modulus and hardness of the resin as well as destroying its clarity. High impact styrene resins prepared according to this invention can be prepared which have a bending modulus in excess of 400,000 p.s.i. and M-scale hardness in excess of 50 and which have clarity which is not obtainable by previously known procedures. Clarity of materials is rather difficult to define quantitatively since much depends upon the thickness of the sample and the condition of the molding. Samples of materials prepared by the methods of this invention have been prepared which permit the reading of print through as much as a 1-inch thick sample of injection molded material.

The properties of the polymers obtained can be altered as has been customary in certain procedures for producing commercial products of high-impact strength as by blending with a rubbery polymer, but this technique is usually not necessary.

As is known in the art, impact strength depends to a certain extent upon the conditions employed in injection molding. In general the highest impact strengths are obtained when the polymer is molded at the minimum temperature and highest pressure practicable.

In the examples, in referring to the properties of the various products the following terms are used:

Impact strength refers to determinations made by the Izod notched method, and is given in foot pounds per inch;
Modulus refers to Young's modulus and is expressed in pounds per square inch;
Hardness is given as Rockwell M;
Mooney means the viscosity expressed as ML-4 at 212° F.;
Heat distortion is given in degrees centigrade at a 264 p.s.i. loading;
ASTM methods were employed;
Clarity or transparency was determined by visual inspection of injection molded pieces;
Parts are by weight unless otherwise indicated.

Examples

A low-molecular-weight polybutadiene for use as the suspending agent in Examples 1–3 was prepared by polymerizing 100 grams of butadiene in 300 grams of hexane for 4 hours at 50° C. with the amounts of 1.75 M solution butyllithium in hexane shown in the following table. The amounts in millimoles are given directly below the amounts given in milliliters.

| | Suspending Agent Solution | | |
|---|---|---|---|
| | A | B | C |
| Butyllithium (BuLi): | | | |
| Milliliters | 28.1 | 25.0 | 5.75 |
| Milliomoles | 49.2 | 43.7 | 10.0 |

A preferred suspending agent is obtained by using sufficient lithium catalyst to provide 10 to 60 milliatoms of active lithium per 100 grams of butadiene.

These polymer solutions were shaken in air until the characteristic amber color of the active lithium compound was destroyed. The resulting solutions were used as suspending agents in Examples 1–3.

Examples 1–3

Butyllithium and the above solutions of suspending agents were added to a solution of 150 g. styrene in 280 g. heptane according to the following table:

| | Example | | |
|---|---|---|---|
| | 1 | 2 | 3 |
| Butyllithium (1.75 M in hexane), ml | 0.6 | 0.65 | 0.7 |
| Suspending agent solution (gms.): | | | |
| A | 6.0 | | |
| B | | 7.0 | |
| C | | | 7.0 |

The polymerizations were carried out in capped bottles which had been purged of air and moisture. The reaction was complete after 4.5 hours at 50° C. The characteristic yellow color of the suspensions was discharged by the addition of 0.5 ml. of water and shaking. The heptane was decanted from the finely divided polymer which was then washed with isopropanol and dried in an oven at 75° C. The polymers were injection molded and had the following properties:

| | Example | | |
|---|---|---|---|
| | 1 | 2 | 3 |
| Relative viscosity | 2.4 | 1.80 | 1.60 |
| Impact strength | 1.0 | 1.3 | 1.0 |
| Modulus | 468,000 | 441,000 | |
| Hardness | 60 | 62 | |
| Clarity | Clear | Clear | (¹) |

¹ Slightly opalescent.

Each of these products has sufficiently high impact strength to be useful by itself as a replacement for the commercial blends, etc. now employed, and the products of Examples 1 and 2 are particularly desirable because they produce molded products which are clearly transparent.

Examples 4–11

These examples illustrate the use of a variety of polymers and copolymers as suspending agents in the polymerization of styrene in an aliphatic hydrocarbon solvent. In each of the examples summarized in the following table 430 g. of a 35 percent styrene solution in heptane was polymerized for 5 hours at 50° C. with butyllithium catalyst as shown in the table.

| Example | 4 | 5 | 6 | 7 | 8 | 9 | 10 | 11 |
|---|---|---|---|---|---|---|---|---|
| Process: | | | | | | | | |
| Suspending Agent | C-oil* | FR-S 195* | PBD* | Polypiperylene.* | Butyl Rubber.* | Polypropylene.* | Polyisoprene.* | Pale Crepe Rubber. |
| Amount | 1.5 g | 1.5 g | 0.6 g | 1.0 g | 1.5 g | 2.25 g | 2.25 g | 0.15 g. |
| Butyllithium (1.75 M in Hexane), ml | 1.0 ml | 1.3 ml | .65 ml | 1.0 ml | 0.65 ml | 0.70 ml | 1.05 ml | 1.3 ml. |
| Product: | | | | | | | | |
| Suspension | Good | Excellent | Excellent | Good | Fair | Fair | Excellent | Excellent. |
| Relative viscosity | 1.74 | 1.87 | 2.08 | 1.42 | | | | |
| Impact strength | 1.4 | 2.1 | 1.6 | | | | | |
| Modulus | 493,000 | 478,500 | 493,000 | | | | | |
| Hardness | 67 | 61 | 65 | | | | | |
| Heat distortion | | 78 | 62 | | | | | |
| Clarity | Slightly opalescent | Quite opalescent. | Slightly opalescent. | | | | | |

*Identification of Suspending Agents:
C-oil MD-11 E-11-D is a commercial product of the Enjay Chemical Company, and is known to be a low-molecular-weight liquid copolymer of butadiene and styrene.
FR-S 195 is a butadiene-styrene copolymer containing 25 percent bound styrene, and is a product of The Firestone Tire & Rubber Company.
PBD is a 12-Mooney polybutadiene prepared by the polymerization of butadiene with butyllithium in hexane solution.

Polypiperylene was prepared by the polymerization of piperylene with butyllithium in hexane solution to an inherent viscosity of 0.42.
Butyl rubber M-25 is an isoprene-isobutylene copolymer of Enjay Chemical Company.
Polypropylene is a rubbery atactic polypropylene prepared with a Ziegler catalyst.
Polyisoprene is a high-molecular-weight polymer prepared by the polymerization of isoprene in hexane solution with a butyllithium catalyst.

It is obvious from an examination of the table, that good suspensions are obtained from the diene copolymers which contain more than 50 percent of diene rubber. Poorer suspensions were obtained with the butyl rubber and the polypropylene, but in all cases indications of suspending action were observed, which resulted in improving the filterability of the polymer product. None of the products on injection molding had the sparkling clarity which was observed in the first two examples. Clarity depends upon the compatibility of the suspending agent with the product which, in turn, is dependent upon the molecular weight and structure of the suspending agent as well as the amount employed. It is possible by the careful control of these factors to produce products which are more or less clear.

Example 12

This example illustrates the preparation of a copolymer of styrene and α-methyl styrene. A solution containing 98 g. styrene, 52 g. α-methyl styrene, and 1.9 g. polybutadiene in 280 g. heptane was polymerized with 1.30 ml. of 1.75 molar butyllithium in hexane. The polybutadiene was prepared by polymerization of butadiene in hexane solution with butyllithium at a ratio of 40 mm. BuLi/100 g. butadiene. The polymerization took place in 16 hours at 50° C. A good suspension was obtained.

The examples and the various materials employed are illustrative and suggestive of other ways of utilizing the various system disclosed in the production of polystyrenes.

I claim:
1. The method of producing polystyrene in the form of particles of a size to be readily filtered and having an impact strength in excess of one foot pound and being substantially transparent, which method consists of polymerizing styrene monomer at a temperature between −100 and 250° C. in a saturated hydrocarbon solvent in which the polymer is insoluble, in the presence of a catalyst selected from the class consisting of alkyl- and aryl-lithiums and 0.05 to 3.0 parts by weight of a polymeric hydrocarbon suspending agent having a molecular weight above 1500, which is completely soluble in the solvent at the polymerization temperature and which is unreactive with the catalyst and with reaction products of the catalyst with the monomer; said suspending agent being selected from the class consisting of (1) homopolymers of dienes containing 4 to 6 carbon atoms, (2) essentially random copolymers of at least 50 percent of such a diene with a monomer of the class consisting of styrene, alpha-methylstyrene and para-methylstyrene, and (3) the following: polyisobutylene, polypropylene, polybutene, ethylene-propylene copolymers and isobutylene-isoprene copolymers.

2. The process of claim 1 in which the styrene was polymerized at substantially 50° C. in heptane using butyllithium catalyst, and substantially 0.1 part of pale crepe rubber as the suspending agent.

References Cited

UNITED STATES PATENTS

| | | | |
|---|---|---|---|
| 2,858,281 | 10/1958 | Bauman et al. | 260—879 |
| 3,095,388 | 6/1963 | Osmond et al. | 260—879 |
| 3,149,182 | 9/1964 | Porter | 260—879 |
| 3,202,642 | 8/1965 | Hardy | 260—93.5 |
| 3,218,302 | 11/1965 | Melamed | 260—93.5 |
| 3,031,432 | 4/1962 | Kern | 260—93.5 |

JOSEPH L. SCHOFER, *Primary Examiner.*

J. C. HAIGHT, *Assistant Examiner.*